(12) United States Patent
Wolff et al.

(10) Patent No.: US 7,770,102 B1
(45) Date of Patent: Aug. 3, 2010

(54) METHOD AND SYSTEM FOR SEMANTICALLY LABELING STRINGS AND PROVIDING ACTIONS BASED ON SEMANTICALLY LABELED STRINGS

(75) Inventors: Roger Wolff, Redmond, WA (US); Tuan Huynh, Seattle, WA (US); Nobuya Higashiyama, Issaquah, WA (US); Ziyi Wang, Redmond, WA (US); Jeff Reynar, Woodinville, WA (US); Michael Ammerlaan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 09/588,411

(22) Filed: Jun. 6, 2000

(51) Int. Cl.
*G06F 17/00* (2006.01)
(52) U.S. Cl. .................................. 715/234; 719/331
(58) Field of Classification Search ............... 715/513, 715/512, 516, 234; 719/331
See application file for complete search history.

(56) References Cited

U.S. PATENT DOCUMENTS

| | | | | |
|---|---|---|---|---|
| 4,674,065 A | * | 6/1987 | Lange et al. ............... 382/311 |
| 4,868,750 A | * | 9/1989 | Kucera et al. ............... 704/8 |
| 5,020,019 A | | 5/1991 | Ogawa ...................... 364/900 |
| 5,128,865 A | * | 7/1992 | Sadler ........................ 704/2 |
| 5,159,552 A | | 10/1992 | van Gasteren et al. ......... 704/1 |
| 5,267,155 A | | 11/1993 | Buchanan et al. ........ 364/419.14 |
| 5,287,448 A | | 2/1994 | Nicol et al. ................. 715/707 |
| 5,297,039 A | | 3/1994 | Kanaegami et al. ............ 707/5 |
| 5,317,546 A | | 5/1994 | Balch et al. .................. 368/9 |
| 5,337,233 A | | 8/1994 | Hofert et al. .......... 364/419.14 |
| 5,341,293 A | | 8/1994 | Vertelney et al. ............ 715/530 |
| 5,351,190 A | | 9/1994 | Kondo .................... 364/419.08 |
| 5,386,564 A | | 1/1995 | Shearer et al. .............. 395/650 |
| 5,392,386 A | | 2/1995 | Chalas ........................ 395/155 |
| 5,418,902 A | | 5/1995 | West et al. .................. 715/503 |
| 5,446,891 A | | 8/1995 | Kaplan et al. ............... 395/600 |

(Continued)

FOREIGN PATENT DOCUMENTS

CA     2 246 920 A1     3/2000

(Continued)

OTHER PUBLICATIONS

Nardi, et al., "Collaborative, Programmable Intelligent Agents", Communications of the ACM, vol. 41, No. 3, published Mar. 1998, p. 96-104.*

(Continued)

*Primary Examiner*—Amelia Rutledge
(74) *Attorney, Agent, or Firm*—Merchant & Gould

(57) ABSTRACT

A method for recognizing strings and annotating, or labeling, the strings with a type label. After the strings are annotated with a type label, application program modules may use the type label to provide users with a choice of actions. If the user's computer does not have any actions associated with a type label, the user may be provided with the option to surf to a download Uniform Resource Locator (URL) and download action plug-ins for that type label. One or more recognizer plug-ins perform the recognition of particular strings in an electronic document. The recognizer plug-ins may be packaged with an application program module or they may be written by third parties to recognize particular strings that are of interest. One or more action plug-ins provide possible actions to be presented to the user based upon the type label associated with the string.

19 Claims, 4 Drawing Sheets

U.S. PATENT DOCUMENTS

| | | | |
|---|---|---|---|
| 5,522,089 A | 5/1996 | Kikinis et al. | 710/73 |
| 5,535,323 A | 7/1996 | Miller et al. | 715/707 |
| 5,541,836 A * | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 364/715.03 |
| 5,685,000 A | 11/1997 | Cox | 704/9 |
| 5,708,825 A | 1/1998 | Sotomayor | 395/762 |
| 5,715,415 A | 2/1998 | Dazey et al. | 715/708 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 395/51 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A | 1/1999 | Pandit | 345/336 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A * | 5/1999 | Gipson | 715/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A * | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Herrmann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/354 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | Van Ketwich | 345/173 |
| 6,073,090 A | 6/2000 | Fortune et al. | 704/8 |
| 6,085,201 A | 7/2000 | Tso | 707/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 707/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 364/419.02 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 707/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe | 709/203 |
| 6,338,059 B1 | 1/2002 | Field et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 * | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Angiulo et al. | 715/779 |

| | | | | | | | |
|---|---|---|---|---|---|---|---|
| 6,470,091 B2 | 10/2002 | Koga et al. | 382/101 | 6,976,090 B2 | 12/2005 | Ben-Shaul et al. | 709/246 |
| 6,473,069 B1 | 10/2002 | Gerpheide | 345/157 | 6,976,209 B1 * | 12/2005 | Storisteanu et al. | 715/512 |
| 6,477,510 B1 | 11/2002 | Johnson | 705/30 | 6,981,212 B1 | 12/2005 | Claussen et al. | 715/205 |
| 6,480,860 B1 | 11/2002 | Monday | 707/102 | 6,986,104 B2 | 1/2006 | Green et al. | 715/523 |
| 6,493,006 B1 | 12/2002 | Gourdol et al. | 345/825 | 6,990,654 B2 | 1/2006 | Carroll, Jr. | 717/109 |
| 6,498,982 B2 | 12/2002 | Bellesfield et al. | 701/202 | 7,003,522 B1 | 2/2006 | Reynar et al. | 707/10 |
| 6,510,504 B2 | 1/2003 | Satyanarayanan | 711/170 | 7,013,289 B2 | 3/2006 | Horn et al. | 705/26 |
| 6,516,321 B1 | 2/2003 | De La Huerga | 707/102 | 7,024,658 B1 | 4/2006 | Cohen et al. | 717/117 |
| 6,519,557 B1 | 2/2003 | Emens et al. | 704/8 | 7,028,312 B1 | 4/2006 | Merrick et al. | 719/330 |
| 6,519,603 B1 * | 2/2003 | Bays et al. | 707/102 | 7,032,174 B2 | 4/2006 | Montero et al. | 715/257 |
| 6,546,433 B1 | 4/2003 | Matheson | 709/318 | 7,039,859 B1 | 5/2006 | Sundaresan | 715/229 |
| 6,553,385 B2 * | 4/2003 | Johnson et al. | 707/104.1 | 7,051,076 B2 | 5/2006 | Tsuchiya | 709/206 |
| 6,556,972 B1 | 4/2003 | Bakis et al. | 704/277 | 7,082,392 B1 | 7/2006 | Butler et al. | 704/233 |
| 6,556,984 B1 | 4/2003 | Zien | 707/2 | 7,100,115 B1 | 8/2006 | Yennaco | 715/748 |
| 6,564,264 B1 | 5/2003 | Creswell et al. | 709/245 | 7,113,976 B2 | 9/2006 | Watanabe | 709/206 |
| 6,571,241 B1 | 5/2003 | Nosohara | 707/6 | 7,146,564 B2 | 12/2006 | Kim et al. | 715/235 |
| 6,571,253 B1 | 5/2003 | Thompson et al. | 707/103 R | 7,216,351 B1 | 5/2007 | Maes | 719/328 |
| 6,591,260 B1 | 7/2003 | Schwarzhoff et al. | 707/2 | 7,237,190 B2 | 6/2007 | Rollins et al. | 715/234 |
| 6,595,342 B1 | 7/2003 | Maritzen et al. | 194/212 | 7,281,245 B2 | 10/2007 | Reynar et al. | 717/173 |
| 6,601,075 B1 | 7/2003 | Huang et al. | 707/104.1 | 7,302,634 B2 | 11/2007 | Lucovsky et al. | 715/200 |
| 6,604,099 B1 | 8/2003 | Chung et al. | 707/3 | 7,305,354 B2 | 12/2007 | Rodriguez et al. | 705/26 |
| 6,615,131 B1 | 9/2003 | Rennard et al. | 701/200 | 7,392,479 B2 | 6/2008 | Jones et al. | 715/513 |
| 6,618,733 B1 * | 9/2003 | White et al. | 707/103 Y | 7,421,645 B2 | 9/2008 | Reynar | 715/206 |
| 6,622,140 B1 | 9/2003 | Kantrowitz | 707/5 | 7,454,459 B1 | 11/2008 | Kapoor et al. | 709/203 |
| 6,623,527 B1 | 9/2003 | Hamzy | 715/513 | 2001/0029605 A1 | 10/2001 | Forbes et al. | 717/11 |
| 6,625,581 B1 | 9/2003 | Perkowski | 705/27 | 2001/0041328 A1 | 11/2001 | Fisher | 434/157 |
| 6,629,079 B1 | 9/2003 | Spiegel et al. | 705/26 | 2001/0042098 A1 | 11/2001 | Gupta et al. | 709/206 |
| 6,631,519 B1 | 10/2003 | Nicholson et al. | 717/169 | 2001/0049702 A1 | 12/2001 | Najmi | 707/513 |
| 6,636,880 B1 | 10/2003 | Bera | 708/206 | 2001/0056461 A1 | 12/2001 | Kampe et al. | 709/201 |
| 6,643,650 B1 | 11/2003 | Slaughter et al. | 707/10 | 2002/0002590 A1 | 1/2002 | King et al. | 709/206 |
| 6,654,734 B1 | 11/2003 | Mani et al. | 707/2 | 2002/0003469 A1 | 1/2002 | Gupta | 340/407.1 |
| 6,654,932 B1 | 11/2003 | Bahrs et al. | 715/507 | 2002/0003898 A1 | 1/2002 | Wu | 382/187 |
| 6,658,623 B1 | 12/2003 | Schilit et al. | 715/513 | 2002/0004803 A1 | 1/2002 | Serebrennikov | 715/513 |
| 6,687,485 B2 | 2/2004 | Hopkins et al. | 434/350 | 2002/0007309 A1 | 1/2002 | Reynar | 705/14 |
| 6,694,307 B2 | 2/2004 | Julien | 707/3 | 2002/0023113 A1 | 2/2002 | Hsing et al. | 707/513 |
| 6,697,824 B1 | 2/2004 | Bowman-Amuah | 707/229 | 2002/0023136 A1 | 2/2002 | Silver et al. | 709/206 |
| 6,697,837 B1 | 2/2004 | Rodov | 709/203 | 2002/0026450 A1 | 2/2002 | Kuramochi | 707/104.1 |
| 6,708,189 B1 | 3/2004 | Fitzsimons et al. | 707/205 | 2002/0029304 A1 | 3/2002 | Reynar et al. | 709/332 |
| 6,715,144 B2 | 3/2004 | Daynes et al. | 717/174 | 2002/0035581 A1 | 3/2002 | Reynar et al. | 715/513 |
| 6,717,593 B1 | 4/2004 | Jennings | 715/760 | 2002/0038180 A1 | 3/2002 | Bellesfield et al. | 701/202 |
| 6,718,516 B1 | 4/2004 | Claussen et al. | 715/513 | 2002/0065110 A1 | 5/2002 | Enns et al. | 455/566 |
| 6,728,679 B1 | 4/2004 | Strubbe et al. | 704/270.1 | 2002/0065891 A1 | 5/2002 | Malik | 709/206 |
| 6,732,090 B2 | 5/2004 | Shanahan et al. | 707/3 | 2002/0066073 A1 | 5/2002 | Lienhard et al. | 717/105 |
| 6,732,361 B1 | 5/2004 | Andreoli et al. | 719/313 | 2002/0078222 A1 | 6/2002 | Compas et al. | 709/232 |
| 6,741,994 B1 | 5/2004 | Kang et al. | 707/102 | 2002/0091803 A1 | 7/2002 | Imamura et al. | 709/220 |
| 6,742,054 B1 | 5/2004 | Upton, IV | 710/6 | 2002/0099687 A1 | 7/2002 | Krishnaprasad et al. | 707/1 |
| 6,745,208 B2 | 6/2004 | Berg et al. | 707/201 | 2002/0100036 A1 | 7/2002 | Moshir et al. | 717/173 |
| 6,766,326 B1 | 7/2004 | Cena | 707/101 | 2002/0103829 A1 | 8/2002 | Manning et al. | 707/513 |
| 6,795,808 B1 | 9/2004 | Strubbe et al. | 704/275 | 2002/0104080 A1 | 8/2002 | Woodard et al. | 717/176 |
| 6,802,061 B1 | 10/2004 | Parthasarathy et al. | 717/173 | 2002/0110225 A1 | 8/2002 | Cullis | 379/67.1 |
| 6,826,726 B2 | 11/2004 | Hsing et al. | 715/513 | 2002/0111928 A1 | 8/2002 | Haddad | 707/1 |
| 6,829,631 B1 | 12/2004 | Forman et al. | 709/202 | 2002/0120685 A1 | 8/2002 | Srivastava et al. | 709/203 |
| 6,845,499 B2 | 1/2005 | Srivastava et al. | 717/100 | 2002/0129107 A1 | 9/2002 | Loughran et al. | 709/206 |
| 6,857,103 B1 | 2/2005 | Wason | 715/709 | 2002/0133523 A1 | 9/2002 | Ambler et al. | 707/536 |
| 6,859,908 B1 | 2/2005 | Clapper | 715/224 | 2002/0149601 A1 | 10/2002 | Rajarajan et al. | 345/619 |
| 6,868,625 B2 | 3/2005 | Szabo | 715/738 | 2002/0156774 A1 | 10/2002 | Beauregard et al. | 707/3 |
| 6,874,125 B1 | 3/2005 | Carroll et al. | 715/705 | 2002/0156792 A1 | 10/2002 | Gombocz et al. | 707/100 |
| 6,874,143 B1 | 3/2005 | Murray et al. | 717/173 | 2002/0169802 A1 | 11/2002 | Brewer et al. | 707/513 |
| 6,880,129 B1 | 4/2005 | Lee et al. | 715/763 | 2002/0175955 A1 | 11/2002 | Gourdol et al. | 345/821 |
| 6,883,137 B1 | 4/2005 | Girardot et al. | 715/513 | 2002/0178008 A1 | 11/2002 | Reynar | 704/272 |
| 6,898,604 B1 | 5/2005 | Ballinger et al. | 707/101 | 2002/0178182 A1 | 11/2002 | Wang et al. | 715/501.1 |
| 6,901,402 B1 | 5/2005 | Corston-Oliver et al. | 701/101 | 2002/0184247 A1 | 12/2002 | Jokela et al. | 707/204 |
| 6,904,560 B1 | 6/2005 | Panda | 715/202 | 2002/0188941 A1 | 12/2002 | Cicciarelli et al. | 717/175 |
| 6,925,457 B2 | 8/2005 | Britton et al. | 707/1 | 2002/0196281 A1 | 12/2002 | Audleman et al. | 345/762 |
| 6,925,470 B1 | 8/2005 | Sangudi et al. | 707/102 | 2002/0198909 A1 | 12/2002 | Huynh et al. | 707/513 |
| 6,944,857 B1 | 9/2005 | Glaser et al. | 717/173 | 2003/0002391 A1 | 1/2003 | Biggs | 368/82 |
| 6,948,133 B2 | 9/2005 | Haley | 715/780 | 2003/0005411 A1 | 1/2003 | Gerken | 717/120 |
| 6,950,831 B2 | 9/2005 | Haley | 707/104.1 | 2003/0009489 A1 | 1/2003 | Griffin | 707/500 |
| 6,950,982 B1 | 9/2005 | Dourish | 715/512 | 2003/0014745 A1 | 1/2003 | Mah et al. | 717/170 |
| 6,957,385 B2 | 10/2005 | Chan et al. | 715/504 | 2003/0025728 A1 | 2/2003 | Ebbo et al. | 345/744 |
| 6,963,867 B2 | 11/2005 | Ford et al. | 707/3 | 2003/0046316 A1 | 3/2003 | Gergic et al. | 707/513 |
| 6,964,010 B1 | 11/2005 | Sharp | 715/507 | 2003/0050911 A1 | 3/2003 | Lucovsky et al. | 707/1 |
| 6,975,983 B1 | 12/2005 | Fortescue et al. | 704/9 | 2003/0051236 A1 | 3/2003 | Pace et al. | 717/177 |

| | | | |
|---|---|---|---|
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101190 A1 | 5/2003 | Horvitz et al. | 707/100 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Aryasantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | 717/178 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0199861 A1 | 10/2004 | Lucovksy | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| CN | ZL 200410005390.8 | 10/2008 |
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |

OTHER PUBLICATIONS

Design methodology and formal validation of hypermedia documents; C.A.S. Santos, L.F.G Soares, G.L. de Souza and J.P. Courtait; *Proceedings of the sixth ACM international conference on multimedia*, (1998) p. 39-48.

Constructing, organizing, and visualizing collections of tropically related Web resources; Loren Terveen, Will Hill and Brian Amento; *ACM Trans. Comput.-um. Interact* 6, 1 (Mar. 1999) p. 67-94.

How to personalize the Web; Rob Barrett, Paul P. Maglio and Daniel C. Kellem; *Conference proceedings on human factors in computing systems* (1997) p. 75-82.

CLUES: dynamic personalized message filtering; Matthew Marx and Chris Schmandt; *Proceedings of the ACM 1996 conference on computer supported cooperative work* (1996) p. 113-121.

Dynamic hyperlink generation for navigation in relational databases; Karl M. Goschka and Jurgen Falb; *Proceedings of the tenth ACM conference on hypertext and hypermedia: returning to our diverse roots* (1999) p. 23-24.

Percepual user interfaces: perceptual intelligence; Alèx Pentland; *Commun. ACM* 43, 3 (Mar. 2000) p. 35-44.

Textual context analysis for information retrieval; Mark A. Stairmand; *Proceedings of the 20th annual international ACM SIGIR conference on research and development in information retrieval* (1997) p. 140-147.

*An XML framework for agent-based E-commerce*; Robert J. Glushko, Jay M. Tenenbaum and Bart Meltzer; Commun. ACM 42, 3 (Mar. 1999) p. 106.

Technique for Automatically Correcting Words in Text; Karen Kukich;*ACM Comput. Surv.*, 24, 4 (Dec. 1992); pp. 377-439.

Putting People First: Specifying Proper Names in Speech Interfaces, Matt Marx and Chris Schmandt; *Proceedings of the ACM Symposium on User Interface Software and Technology*; 1994, pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management, H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center, Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/841,266, filed Apr. 24, 2001, entitled "Method and System for Providing Electronic Commerce Actions Based on Semantically Labeled Strings."
U.S. Appl. No. 09/906,552, filed Jul. 16, 2001, entitled "Method and System for Providing Restricted Actions for Recognized Semantic Categories."
U.S. Appl. No. 09/906,467, filed Jul. 16, 2001, entitled "Application Program Interfaces for Semantically Labeling Strings and Providing Actions Based on Semantically Labeled Strings."
U.S. Appl. No. 09/907,418, filed Jul. 17, 2001, entitled "Method and System for Defining Semantic Categories and Actions."
U.S. Appl. No. 10/141,712, filed May 9, 2002, entitled "Method, System, and Apparatus for Converting Dates Between Calendars and Languages Based Upon Semantically Labeled Strings."
U.S. Appl. No. 10/154,630, filed May 23, 2002, entitled "Method, System, and Apparatus for Converting Numbers Based Upon Semantically Labeled Strings."
U.S. Appl. No. 10/140,544, filed May 7, 2002, entitled "Method, System, and Apparatus for Converting Numbers Between Measurement Systems Based Upon Semantically Labeled Strings."
U.S. Appl. No. 10,155,680, filed May 23, 2002, entitled "Method, System, and Apparatus for Converting Currency Values Based Upon Semantically Labeled Strings."
U.S. Appl. No. 10/179,810, filed Jun. 25, 2002, entitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex/hypermart.net/books.bsd/501-504.html, pp. 1-20.
Kuenning, Geoff, "International Ispell," Version 3.1.00, Oct. 8, 1993, http:// www.rt.com/man/findaffix.1.html, http://www.csee.usf.edu/cgi-bin/man-cig?ispell, http://fmg-www.cs.ucla.edu/geoff/ispell.html, pp. 1-33.
Kuenning, Geoff, "Ispell, v. 3.1," http://theochem.ki.ku.dk/on_line_docs/ispell/ispell_I.html, pp. 1-6.
"UNIX Man Pages: sed," http://www.calpoly.edu/cgi-bin/man-cgi?spell+1, pp. 1-14.
McMahon, Lee. E., "SED—A Non-Interactive Text Editor," Bell Laboratories, Murray Hill, New Jersey 07974, pp. 1-15.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12.
IBM Corporation, IBM Research Disclosure#368;"Multimedia Hyperlinks Automatically Created For Reference Documents," *IBM Technical Disclosure* Bulletin, Jun. 1993, pp. 1-5.
*The Complete LINUX™ Operating System 5.2 Delux*, Red Hot,® Macmillian Digital Publishing USA, A Viacom Company, Red Hat Software, Inc., ISBN 1-57595-199-1B, pp. 1-385.
*User Manual For AddressMate and AddressMate Plus*, CoStar Corporation, AddressMate Software, 1994-1995, pp. 1-210.
Getting Results With Microsoft® Office 97, *Real World Solutions For The Work You Do*, Microsoft Corporation, pp. 1-703.
*InfoCentral™ 7*, User's Manual, Corel Corporation, vol. 1, Version 7.0, 1996, pp. 1-86.
Corel® Office Professional 7 Quick Results User's Manual, vol. 1, Version 7.0 (first printing), Corel Corporation, Limited, pp. 1-531.
Novel GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997.
Developer's Guide To Apple Data Detectors, For Version 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.
Hewkin "Smart Tags-the Distributed-Memory Resolution," IEE Review, Jun. 22, 1989, pp. 203-206.
Measuring Units Conversion Table—http://web.archie.org- 1997 Internet French Property, pp. 1-4.
IBM Technical Disclosure Bulletin, "National Language Support Enhancement for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 105-151.
Driza, Scott, "Learn Word 2000 VBA Document Automation", Wordware Publishing Inc., 2001, 6 pp.
Cornell, Paul, "Developing smart Tag DLLs", MSDN Library, http://msdn.microsoft.com/library/default.asp?url=/library/en-us/dnsmarttag/html/odc_smarrttags.asp, Apr. 2001, pp. 8.
Menu Customizing, IBM Technical Disclosure Bulletin, vol. 34, No. 1, Jun. 1991, pp. 92-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schilz, Charles, "Writing Applications for Uniform Operation on a Mainframe or PC: A Metric Conversion Program", Lockheed Missles & Space Company, Inc., Sunyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.fluswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.
"BizTalk Server 2002 Mapper User Interface", http://msdn.microsoft.com/library/en-us/bts_2002/htm/lat_xmltools_map_concept_codw..., Microsoft Corporation, 1999-2001, pp. 1.
"BizTalk Server 2002 Complting Maps", http://msdn.microsoft.com/library/en-us/bts_2002/htm/lat_xmltools_map_concept_drgl.a..., Microsoft Corporatuion, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamily.mspx, Microsoft Corporation, Oct. 2002-Feb. 2003, pp. 1-2.

"Q&A: How 'XDocs' Alerts the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Univeils Visual Studio.NET Enterprise Tools", Microsoft Corporation, http://microsoft.com/presspass/press/2001/may01/5-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Coropration, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2002, pp. 723-745.

V. Braganholo, "Updating Relational Databases Through XML Views", Technical Report, Sep. 2002, pp. 1-16.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Environment (IDE)", http://web.archive.org/web/20020602032242/http:altova.com/product_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibility", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbotext' Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section "Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, I-77.

Bosak, "XML: The Universal Publishing Format", SGML/XML Europe '98, May 1995, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Featurs in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

U.S. Appl. No. 10/164,960, filed Jun. 6, 2002, entitled "Providing Contextually Sensitive Actions and Help Content in Computer-Generated Documents".

U.S. Appl. No. 10/164,260, filed Jun. 5, 2002, entitled "Mechanism for Downloading Software Components from a Remote Source for Use by a Local Software Application".

U.S. Appl. No. 10/731,899, filed Dec. 9, 2003, entitled "Mechanism for Downloading Components Associated with XML Documents and Smart Documents".

U.S. Appl. No. 10/366,141, filed Feb. 13, 2003, entitled "Linking Elements of a Document to Corresponding Fields, Queries and/or Procedures in a Database".

U.S. Appl. No. 10/377,258, filed Feb. 28, 2003, entitled "Method and System for Enhancing Paste Functionality of a Computer Software Application".

U.S. Appl. No. 10/426,446, filed Apr. 29, 2003, entitled "Methods and System for Recognizing Names in a Computer-Generated Document and for Providing Helpful Actions Associated with Recognized Names".

U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376, filed Jan. 17, 2004, entitled "Methods and Systems for Providing Automatic Actions on Recognized Text Strings in a Computer-Generated Document".

U.S. Appl. No. 10/184,190, filed Jun. 27, 2002, entitled "System and Method for Providing Namespace Related Information".

U.S. Appl. No. 10/183,317, filed Jun. 25, 2002, entitled "System and Method for Issuing a Message to a Program".

U.S. Official Action dated Feb. 12, 2004 in U.S. Appl. No. 10/154,630.

U.S. Official Action dated Mar. 29, 2004 in U.S. Appl. No. 09/906,552.

U.S. Official Action dated Jun. 18, 2004 in U.S. Appl. No. 09/818,157.

U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/813,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544..
U.S. Official Action dated Feb. 2, 2006 in U.S. Appl. No. 09/906,467.
U.S. Official Action dated Feb. 16, 2006 in U.S. Appl. No. 10/184,298.
Harold, E.R., "XML: Extensible Markup Language", IDG Books Worldwide, Books 24x7.com printout, 1998, 20 pp.
Marais, Hannes, "Supporting Cooperative and Personal Surfing With a Desktop Assistant", 1997, ACM Press, pp. 129-138.
U.S. Appl. No. 11/396,397, filed Apr. 3, 2006, entitled "Automatically Adding Proper Names to a Database".
European Communication dated Sep. 25, 2006 in EP 03 01 4181.
World Wide Web Consortium "Document Object Model (DOM) Level 2 Events Specification, Version 1.0", httpL://www.w3.org/TR/2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
"Word 2002 Add in: measurement Converter Smart Tag", http://www.microsoft.com/downloads/details.aspx?FamilyID=f67fc42c-5f41-4c3f-9d5a-7354471dc32&DisplayLang=en, retrieved on Nov. 9, 2006, 2 pgs.
"Microsoft Measurement Converter Smart Tag—Chinese Version", http://www.jiyang.gov/cn/laying/My%20Pictures/%E8%B4%E5%BA%86%E8%BE%89/office2003/FILES/PFILES/COMMON/MSSHARED/SMARTTAG/CMEASURE/1033/CHMCABT.HTML, retrieved on Nov. 7, 2006, 2 pgs.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer),aspx, 9 pgs.
Johnson, L., "What's So Special About Paste Special?", Jun. 2002, Internet article, XP-002420702, http://pubs.logicalexpression.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
Pershikov, V.I., "Explanatory Dictionary in Informatics," Finances and Statistics, Moscow, 1991 (in Russian with translated sections) 5 pgs.
David D. Lewis et al., "A Sequential Algorithm for Training Text Classifiers," Spring-Verlag New York, Inc., 1994, pp. 1-10.
Wei Ying-bin et al., "A New Technology ColdFusion of Realizing Dynamic Webpage," 2000, 6 pgs. (English language translation, pp. 1-6).
V. Doroth et al., "Modern Computer Vocabulary," St. Petersburg, BHV-Petersburg, 2001, p. 465 (with English language translation).
Rubin, C., "Microsoft Word 2000 Official Manual", First Edition, Nikkie BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 12, 2008 cited in U.S. Appl. No. 10/426,446.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 8, 2008 cited in Japanese Application No. 2003-128417.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
U.S. Official Action dated May 14, 2007 cited in U.S. Appl. No. 09/906,552.
U.S. Final Office Action dated May 18, 2007 cited in U.S. Appl. No. 10/155,680.
U.S. Official Action dated May 30, 2007 cited in U.S. Appl. No. 09/906,467.

U.S. Final Official Action dated Jun. 15, 2007 cited in U.S. Appl. No. 10/731,899.
Blaheta et al., "Assigning Function Tags to Parsed Text," Morgan Kaufmann Publishers Inc., 2000, pp. 234-240.
U.S. Appl. No. 11/924,856, filed Oct. 26, 2007 entitled "Providing Contextually Sensitive Tools and Help Content in Computer-Generated Documents".
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
U.S. Official Action mailed Apr. 1, 2008 cited in U.S. Appl. No. 09/907,418.
U.S. Office Action mailed Apr. 4, 2008 cited in U.S. Appl. No. 10/155,680.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
"The Spatial Smart Tag", Geomatic Technilogies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Spe. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Office Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. NO. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6—1527 / 1447754.
Chinses Official Action dated Dec. 7, 2007 in Chinese Application No. 200510088529.4
Chinese Second Official Action dated Aug. 15, 2008 in Chinese Application No. 200510088529.4
Malaysian Official Action dated Aug. 29, 2008 cited in Malaysian Application No. PI 20031902.
Polish Official Action dated Aug. 27, 2008 in Polish Application No. P360520.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes,"W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.
Malaysian Search Report dated Aug. 2, 2007 cited in Malaysian Application No. PI 20040265.
U.S. Office Action dated Sep. 27, 2007 cited in U.S. Appl. No. 10/608,267.
U.S. Office Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 13, 2007 cited in U.S. Appl. No. 10/154,630.
U.S. Office Action dated Jul. 20, 2007 cited in U.S. Appl. No. 09/841,265.
European Communication dated Sep. 25, 2007 cited in European Application No. 03 014 181.6—1243.
Japanese Official Action dated Oct. 19, 2007 cited in Japanese Application No. 2003/128417.
Rubin, Charles, "Microsoft Word 2000 Official Manual," First Edition, Nikkei BP Soft Press, Inc., Aug. 2, 1999, pp. 215-217.
U.S. Final Office Action dated Dec. 7, 2007 cited in U.S. Appl. No. 10/426,446.
U.S. Final Office Action dated Jul. 26, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
Japanese Office Action dated Oct. 10, 2008 cited in Application No. 2004-037158.
Chinese Office Action dated Oct. 17, 2008 cited in Application No. 03145242.6.
U.S. Final Office Action dated Dec. 8, 2008 cited in U.S. Appl. No. 10/183,317.
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/__Man__NeXT__html/html, http://duplex.hypermart.net/books.bsd/501-504.1iiml, pp. 1-20. Aug. 23, 2003.
Kuenning, Geoff, "International Ispell,"Version 3.1.00, Oct. 8, 1993, http:// www.rt.com/man/findaffix.1.html, http://www.csee.usf.edu/cgi-bin/man-cig?ispell, http://fmg-www.cs.ucla.edu/geoff/ispell.html, pp. 1-33.
Kuenning, Geoff, "Ispell, v. 3.1," http://theochem.ki.ku.dk/on__line__docs/ispell/ispell__1.html, pp. 1-6. 1993.
"UNIX Man Pages: sed," http://www.calpoly.edu/cgi-bin/man-cgi?spell+1, pp. 1-14. Aug. 23, 2003.
McMahon, Lee. E., "SED - A Non-Interactive Text Editor," Bell Laboratories, Murray Hill, New Jersey 07974, pp. 1-15. published Aug. 1978.
Beitner, N. D.; Hall, W.; Goble, C.A., "Multimedia Support and Authoring in Microcosm: An Extended Model," Dept. of Electronics and Computer Science, Univ. of Southampton, Southampton SO17 IBJ, UK; Dept. of Computer Science, Univ. of Manchester, Oxford Road, Manchester MI3 9PL, UK, pp. 1-12. 1994.
IBM Corporation, IBM Research Disclosure #368; "Multimedia Hyperlinks Automatically Created for Reference Documents," *IBM Technical Disclosure* Bulletin, Jun. 1993, pp. 1-5. Jun. 1993.
*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385. copyright 1998.

*User Manual for AddressMate and AddressMate Plus*, CoStar Corporation, AddressMate Software, 1994-1995, pp. 1-210. copyright 1997.

*Getting Results With Microsoft® Office 97, Real World Solutions for the Work You Do*, Microsoft Corporation, pp. 1-703. copyright 1997.

*InfoCentral™ 7*, User's Manual, Corel Corporation, vol. 1, Version 7.0, 1996, pp. 1-86.

Corel® Office Professional 7 Quick Results User's Manual vol. 1, Version 7.0 (first printing), Corel Corporation, Limited, pp. 1-531. published 1995.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, for Macintosh, Claris Corporation, 1995-1997.

Developer's Guide to Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

Microsoft Computer Dictionary, Fifth Edition, Microsoft Press, p. 409. published May.

Sharon Oviatt et al., "Integration and Synchronization of Input Modes during Multimodal Human-Computer Interaction," CHI 97, Atlanta, Georgia, Mar. 22-27, 1997, pp. 415-422.

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).

U.S. Final Office Action dated Jan. 22, 2009 cited in U.S. Appl. No. 10/366,141.

U.S. Office Action dated Feb. 4, 2009 cited in U.S. Appl. No. 10/377,258.

U.S. Final Office Action dated Mar. 4, 2009 cited in U.S. Appl. No. 10/780,376.

European Summons to Attend Oral Proceedings dated Feb. 26, 2009 cited in European Application No. 0301283.0-2211.

European Communication dated Mar. 18, 2009 cited in European Application No. 04003683.2-2211.

European Summons to Attend Oral Proceedings dated Mar. 20, 2009 cited in European Application No. 03012830.0.

Australian First Examiner's Report dated Sep. 15, 2008 cited in Australian Application No. 2003204379.

Japanese Final Official Action dated Nov. 25, 2008 cited in Japanese Application No. 2002-207514.

Japanese Official Action dated Feb. 6, 2009 cited in Japanese Application No. 2003-180218.

Japanese Official Action dated Feb. 13, 2009 cited in Japanese Application No. 2003-162911.

Japanese Official Action dated Feb. 24, 2009 cited in Japanese Application No. 2003-161338.

Japanese Official Action dated Mar. 6, 2009 cited in Japanese Application No. 2004-042140.

D. Richter, "Windows for professionals" (Win32 API programming for Windows NT 3.5 and Windows 95, translation from English, Moscow: Russian Edition, 1995, ISBN 5-7502-0010-8, pp. 26, 31, 215.

Glover et al., "Inferring hierarchical Descriptions," ACM, 2002, pp. 507-514.

* cited by examiner

METHOD AND SYSTEM FOR SEMANTICALLY LABELING STRINGS AND PROVIDING ACTIONS BASED ON SEMANTICALLY LABELED STRINGS

TECHNICAL FIELD

This invention relates to document creation program modules. More particularly, this invention relates to a method and system for semantically labeling strings of text during creation of an electronic document and providing a selection of actions that may be performed based on the semantically labeled strings.

BACKGROUND OF THE INVENTION

Electronic documents such as word processing documents and spreadsheet documents typically include semantic information that would be helpful if the information was recognized as such. Recognition and use of this semantic information could result in increased interoperability between desktop software applications and other desktop applications and/or web-based applications.

The ability to recognize strings of text, such as in search engines, is well-known. Additionally, various information retrieval systems have capabilities to label documents. For example, the LEXIS-NEXIS service provides links in some of its documents for company names, famous people and stock ticker symbols.

However, none of the services described above allow strings of text to be labeled with semantic information on-the-fly, i.e., as a user is typing text into a document and creating a document. Thus, there is a need for a method and system for semantically labeling strings while a user is creating a document and providing user actions based on the type of semantic label applied to the string.

In addition to the need described above, there are other needs associated with electronic document program modules such as word processing program modules and spreadsheet program modules. There is the need for tighter integration between electronic document program modules and personal information manager program modules. For example, a user often wants to insert an address stored in a contacts folder of a personal information manager into a word processing document, such as when writing a letter. This insertion may be time-consuming. Typically, the insertion requires the user to switch from a word processing program module to the personal information manager program module, open the contacts folder, find the appropriate person in the contacts folder, copy the address from the contacts folder, switch back to the word processing program module and paste the address into the document at the appropriate place. Thus, there is a need for a tighter integration between information stored in personal information manager program modules and information needed by electronic document program modules.

There is also the need for tighter integration between web properties and the content of electronic documents. For example, sales people sometimes need directions to a client's site. The address of the client's site may be included in an e-mail message or electronic document. However, getting directions to the client's site via an Internet mapping service requires navigating to a website, entering the elements of the address into the appropriate search fields (e.g. street address, city, state, zip) and executing a search for the correct map. Thus, there is the need for tighter integration between web properties and the content of electronic documents.

There is also the need for integration between information on an Intranet and the content of electronic documents because different organizations have different types of data they deem important. Certain industries, services and professions may have words which are commonly found in documents. For instance, in drug companies, chemical names are extremely important and there's likely to be a myriad of information about a particular chemical name on a drug company's Intranet. For car companies, the important data might be model names or part numbers. For universities, the important data might be names of professors, students or courses. The prior art services do not allow customization of strings that may be recognized. None of the prior art services allow third parties to provide a recognition program module so that these customized words may be recognized and an action program module so that appropriate actions may be taken based upon these recognized words. Thus, there is the need for integration between important data on an Intranet and the content of electronic documents.

Thus, there is a need for a method and system for semantically labeling strings while a user is creating a document and providing user actions based on the type of semantic label. There is a further need for a tighter integration between information stored in personal information manager program modules and information needed by other program modules. There is also the need for tighter integration between web properties and the content of electronic documents. There is the further need for integration between important data on an Intranet and the content of electronic documents.

SUMMARY OF THE INVENTION

The present invention satisfies the above described needs by providing a method and system for semantically labeling strings of text during creation of an electronic document and providing a selection of actions that may be performed based on the semantically labeled strings.

In one aspect, the present invention provides a computer-implemented method for semantically labeling strings during creation of an electronic document. When an application program module receives a new string, such as when the user enters a new paragraph or cell value into an electronic document or edits a previously entered paragraph, the paragraph containing the new string is passed from the application program module to a recognizer DLL. The recognizer DLL is responsible for communicating with the application program module, managing the jobs that need to be performed by the recognizer plug-ins, receiving results from the recognizer plug-ins and sending semantic category information to the application program module.

During idle time, the paragraph is passed to the recognizer plug-ins. The recognizer plug-ins are executed on the paragraph to recognize keywords or perform other actions defined by the recognizer plug-in. As part of executing the recognizer plug-in, the paragraph or cell value may be broken into sentences by the recognizer plug-in. However, each recognizer plug-in is responsible for its own sentence-breaking. After the keywords are found, the results from each of the recognizer plug-ins are received by the recognizer DLL. The results from the recognizer plug-ins are compiled into semantic categories by the recognizer DLL and the semantic categories are sent to the application program module. The application program module displays the semantic categories to the user in the electronic document.

These and other features, advantages, and aspects of the present invention may be more clearly understood and appre-

DETAILED DESCRIPTION

Figure 1:
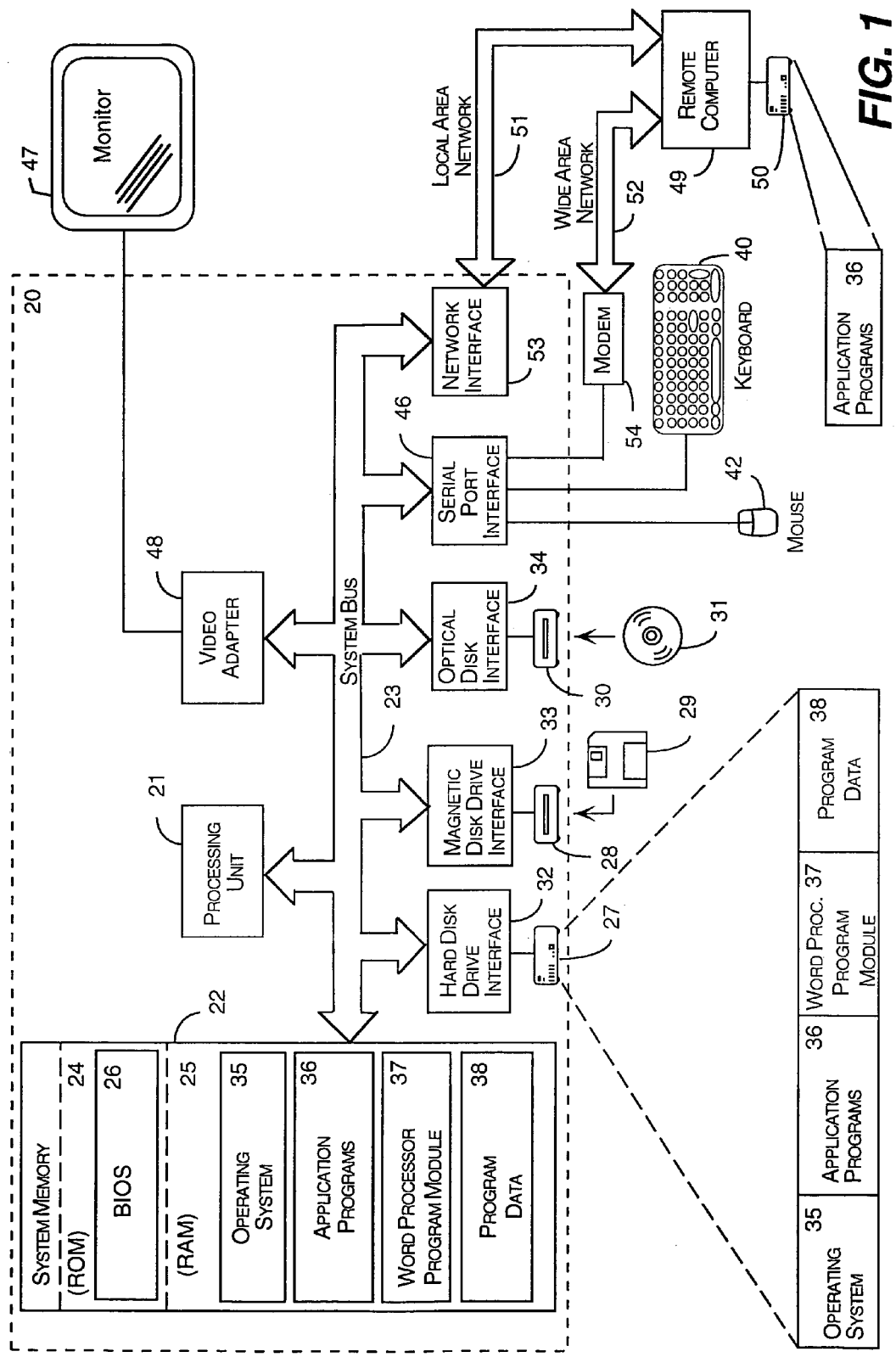
FIG. 1 is a block diagram of a computer that provides the exemplary operating environment for the present invention.

The present invention is directed toward a method and system for semantically labeling strings of text during creation of an electronic document and providing a selection of actions that may be performed based on the semantically labeled strings. A string is defined as a data structure composed of a sequence of characters usually representing human-readable text.

In one embodiment, the invention is incorporated into a suite of application programs referred to as "OFFICE", and more particularly is incorporated into a preferred word processing application program entitled "WORD 10.0" and a preferred spreadsheet application program entitled "EXCEL 10.0", both marketed by Microsoft Corporation of Redmond, Wash. Briefly described, the preferred application programs allow a user to create and edit electronic documents by entering characters, symbols, graphical objects, and commands.

In one embodiment, the invention comprises recognizing strings and annotating, or labeling, the strings with a type label. After the strings are annotated with a type label, application program modules may use the type label to provide users with a choice of actions. If the user's computer does not have any actions associated with that type label, the user may be provided with the option to surf to a download Uniform Resource Locator (URL) and download action plug-ins for that type label.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or a spreadsheet program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
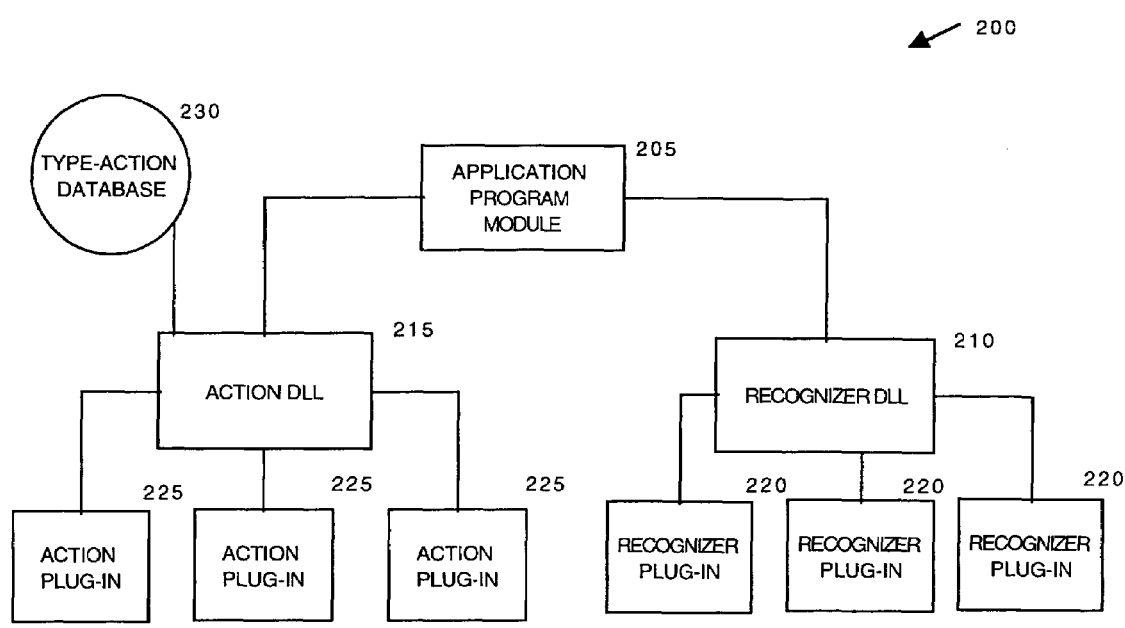
FIG. 2 is a block diagram illustrating an exemplary architecture for use in conjunction with an embodiment of the present invention.

FIG. 2 is a block diagram illustrating an exemplary architecture 200 for use in conjunction with an embodiment of the present invention. The architecture includes an application program module 205, such as word processor program module 37 (FIG. 1). The application program module 205 is able to communicate with a recognizer dynamic-link library 210 (hereinafter recognizer DLL) and an action dynamic-link library 215 (hereinafter action DLL) as a user is creating or editing an electronic document. The recognizer DLL 210 controls a number of recognizer plug-ins 220. The action DLL 215 controls a number of action plug-ins 225. The action DLL also controls a type-action database 230.

In a preferred embodiment, the action plug-ins and recognizer plug-ins are Automation Servers. Automation Servers are well-known software components which are assembled into programs or add functionality to existing programs running on the Microsoft WINDOWS® operating system. Automation Servers may be written in a variety of computing languages and can be un-plugged from a program at run time without having to recompile the program.

The recognizer DLL 210 handles the distribution of strings from the electronic document running on the application program module 205 to the individual recognizer plug-ins 220. The recognizer plug-ins 220 recognize particular strings in an electronic document, such as a word processing document or a spreadsheet document. The recognizer plug-ins 220 may be packaged with the application program module 205 or they may be written by third parties to recognize particular strings that are of interest. Typically, the recognizer DLL 210 passes strings to the recognizer plug-ins 220 in one paragraph or cell value increments.

As part of recognizing certain strings as including semantic information, the recognizer plug-ins 220 determine which strings are to be labeled and how they are to be labeled. After receiving these results from the various recognizer plug-ins 220, the recognizer DLL 210 sends semantic categories to the application program module. In a preferred embodiment, a semantic category comprises the recognized string, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After a string is labeled by a recognizer plug-in 220 and a semantic category is sent to the application program module 205, the user of the application program module 205 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 205 or written by third parties to perform particular actions that are of interest to the third party. The action plug-ins provide possible actions to be presented to the user based upon the type label associated with the string. The action DLL 215 determines what type label the semantic category is and cross-references the type label in the type-action database 230 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 205 so that the action plug-in may execute the desired action. Typically, the application program module sends the action DLL an automation request to invoke the action the user has selected.

As described above, the combination of the recognized string, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title". In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this book", then the download URL may be used to navigate the user's web browser to an appropriate website to download this action plug-in.

It should also be understood that the present invention, in a preferred embodiment, also recognizes sequences of capitalized words that contain function words, and which are likely to be special, but for which there is no type label information. These strings are typically labeled by a grammar checker program module.

The actions provided for a semantic category may utilize both the type label and the text of the recognized string. For example, a word processor program module may use a grammar checker as a recognizer plug-in to label strings that are person names. After a string has been labeled as a person's name, the word processor program module may, through a standard user interface mechanism, allow users to execute pertinent actions, such as looking up the person's name in the contacts folder in a personal information manager program module, sending electronic mail, or searching for the person's name in an HR database.

Having described an exemplary architecture, an exemplary method 300 for semantically labeling strings during document creation will be described below in reference to FIGS. 2 and 3.

Method for Semantically Labeling Strings During Document Creation

Figure 3:
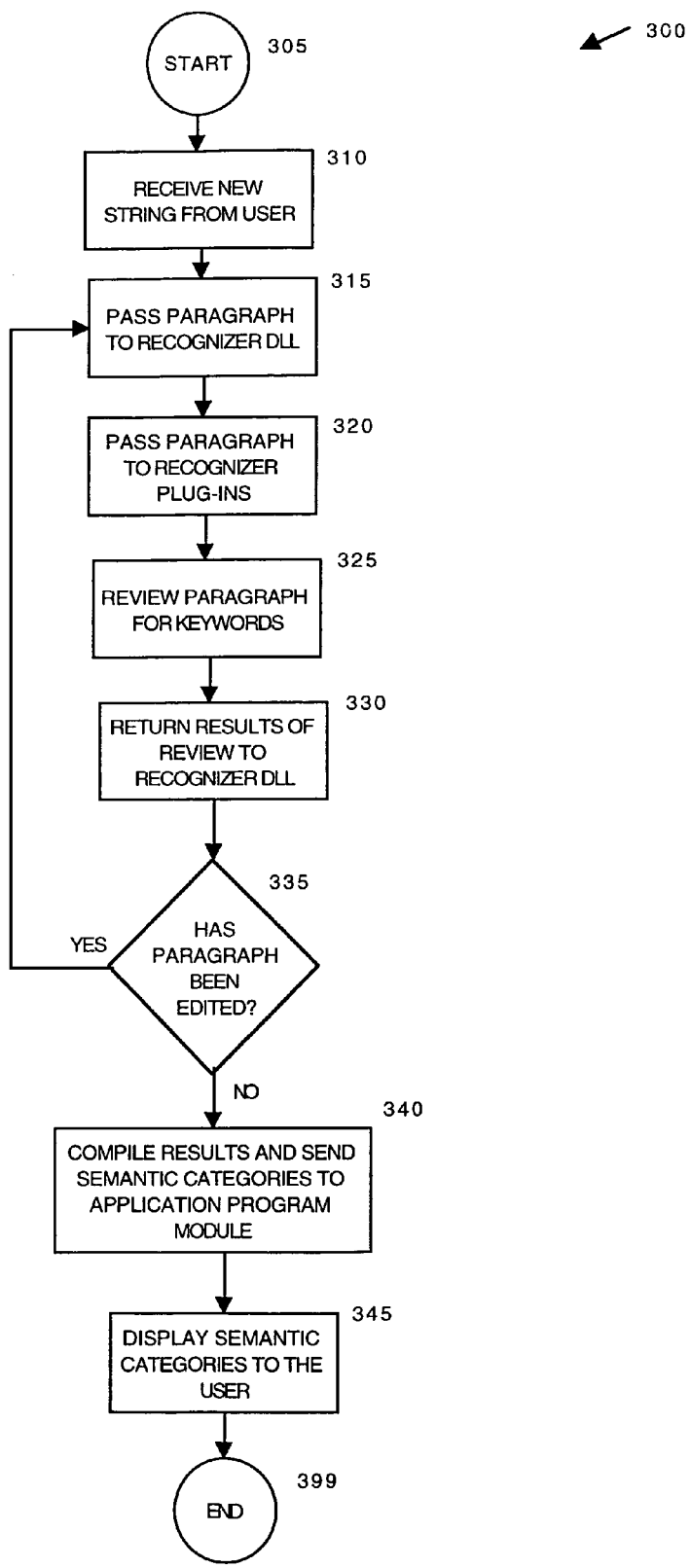
FIG. 3 is a flow chart illustrating a method for semantically labeling strings during creation of an electronic document in accordance with an exemplary embodiment of the present invention.

FIG. 3 is a flow chart illustrating a method 300 for semantically labeling strings during creation of an electronic document in accordance with an exemplary embodiment of the present invention. Those skilled in the art will appreciate that this exemplary embodiment is a computer-implemented process that is carried out by the computer in response to input from the user and instructions provided by a program module.

Referring to FIG. 3, the method 300 begins at start step 305 and proceeds to step 310 when a user opens an electronic document in application program module 205. In a preferred embodiment, the electronic document is a word processing document or a spreadsheet document. However, the invention is not limited to either of these specific types of electronic document.

At step 310, the application program module 205 receives a new string, such as when the user enters a new paragraph into the electronic document or edits a previously entered paragraph. The method 300 then proceeds to step 315.

At step 315, the paragraph containing the new string is passed from the application program module 205 to the recognizer DLL 210. The recognizer DLL is responsible for communicating with the application program module, managing the jobs that need to be performed by the recognizer plug-ins, receiving results from the recognizer plug-ins and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc. may be passed to the recognizer DLL. In other words, the present invention is not limited to simply passing a paragraph to the recognizer DLL. The method 300 then proceeds to step 320.

Still referring to step 315, the application program module 205 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As understood from the above description, the present invention comprises an architecture for recognizing semantic categories that permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins that pertain to that type label. The action plug-ins preferably are COM objects that are executed via communication between the application program module and the action DLL. Parameters necessary to execute the action (the html of the string labeled as being of a particular type, the html of the string representing the current selection) will be passed from the application program module to the action DLL and, in turn, passed to the action plug-in.

Actions Assigned to Type Labels in a Preferred Embodiment

The present invention further comprises an architecture for identifying and executing a set of actions associated with a semantic category. This architecture comprises actions that apply to a particular type label (e.g. an action for book titles may be "Buy this book from shop.Microsoft.com") and executing those actions when the user so desires. An action is a user-initiated function applied to a typed string. For example, adding a name to the contacts folder is one action possible for a type label "Person name".

It should be understood that a significant aspect of the present invention is the power and flexibility that results from allowing third party vendors, such as IT professionals, to design and write recognizer plug-ins and action plug-ins for deployment within an organization or for deployment on the World Wide Web. Some example actions that may be executed include:

Schedule a meeting
Create task
Display calendar
Add to contacts folder
Look up in contacts folder, address book, Windows Address Book (WAB), Global Address List (GAL), etc.
Insert address into document
Send mail to
Display EXPEDIA map
Stock quote lookup
Send instant message to In a preferred embodiment, different actions are assigned to different type labels and these type label-action assignments are stored in the type-action database 230. Table 1 below illustrates some possible type label-action pairings.

TABLE 1

| Type Labels | Actions |
| --- | --- |
| Person name | Show contact info |
|  | Add to contacts |
|  | E-mail |
|  | Insert address into document |
|  | Send instant message to |
| Date | Show calendar for that day |
|  | New task with that due date |
|  | Schedule meeting that day |
| Place | Display EXPEDIA map |
|  | Add to contacts |
| Address | Add to contacts |
| Phone number | Add to contacts |
| E-mail | Add to contacts |
| Date | Schedule a meeting |
| Task | Schedule a task |
| Meeting | Schedule a meeting |

For each type label, the type-action database 230 will store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Storing Semantic Categories

In a preferred embodiment, semantic categories are stored as part of the electronic document along with other document information and are available when a document is transmitted from one computer to another computer. In a preferred embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents.

Checking a "Save semantic categories as XML properties" checkbox (off by default) will write out the text of all of the semantic categories in the document and their labels in the header of the html file in XML (that is using the same tags as are used inline, but surrounded by <xml> And </xml>) for easy identification and parsing by search engines and knowledge management systems.

In a preferred embodiment, semantic categories are saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact")

Although the method 300 described above is one method for identifying semantic categories, in a preferred embodiment of the present invention, there are two other mechanisms for identifying semantic categories. One mechanism is a grammar checker program module (not shown) connected to word processor program module 37. Another mechanism is receiving a semantic category from another electronic document. For example, when text containing a semantic category is copied from one electronic document and pasted into another electronic document of the word processor program module 37, the information identifying the semantic category is preserved and copied along with the copied text. These two additional mechanisms are described in more detail below.

Using a Grammar Checker Program Module to Identify Semantic Categories

In a preferred embodiment of the present invention, a grammar checker program module may be used to identify semantic categories of the following types:

Person names (Example: Bill Smith)
Complete dates (Example: May 1, 1999)
Partial dates (Examples: May 1999; May 1)
A limited subset of temporal expressions (Examples: today, tomorrow, next Tuesday)
Times (Examples: 4:00 PM; 17:30)
Addresses (Example: 1053 Church Street Abington, Pa. 19001)
Places (Example: Trafalger Square)
Cities (Example: Pittsburgh)
Phone Numbers (Example: 215-887-9093)
E-mail addresses (Example: bob@xyz.com)
Web addresses In a preferred embodiment, the grammar checker program module will sometimes send a normalized form of the string to the word processor program module along with the other semantic category information. For example, for the strings May 11, 1999 and May 11, 1999, the grammar checker program module sends the normalized form "May 11, 1999" to the word processor program module. The word processor program module stores this normalized form of the string to make it easier to query a personal information manager program module, web properties and other program modules. For example, the grammar checker program module may return normalized forms for the following strings:

Dates (Example: "today" normalized to "10/15/99")
Times (Examples: "4 pm" normalized to "4:00 pm")
Telephone numbers (to normalize for variants involving parentheses and hyphens)

It should be understood that the normalized forms for dates and times will typically be determined at write time of a document rather than read time.

Identifying Semantic Categories Via Cut and Paste

In a preferred embodiment, copying or cutting a semantic category from one application program module and pasting the semantic category into a second application program module that recognizes semantic categories will preserve the semantic category. In other words, copying and pasting (or dragging and dropping) a string labeled with semantic category information will copy the string and the string's semantic category information. Moreover, it follows that complete documents sent from one application program module (or computer) to another application program module (or computer) will also typically preserve the semantic categories.

In a preferred embodiment, semantic categories are placed in the clipboard in CF_HTML. CF_HTML, or clipboard format HTML, is essentially HTML with some clipboard specific properties such as the length of the HTML string. However, application program modules that do not recognize semantic categories may make a special effort to persist pasted semantic categories. For example, pasted semantic categories may be preserved as unknown HTML. semantic categories Displaying Semantic Categories to the User Referring now to FIG. 4A, an illustration of a display of a preferred embodiment of a semantic category 400 and its associated dropdown menu 405 will be described. It should be understood that FIG. 4A is an illustration of a semantic category 400 and dropdown menu 405 as displayed to a user by the application program module 205.

The string 410 associated with semantic category 400 is the string "Bob Smith". As shown in FIG. 4A, the string 410 of a semantic category 400 may be identified to the user by brackets 415. Of course, many other devices such as coloring, underlining, icons, etc. may be used to indicate to the user that a particular string is a semantic category.

In a preferred embodiment, when the user hovers a cursor over the string 410 or places the insertion point within string 410, then dropdown menu 405 is displayed to the user. The dropdown menu typically displays a list of actions associated with a semantic category. The dropdown menu typically appears above and to the left of the semantic category string.

Figure 4A:
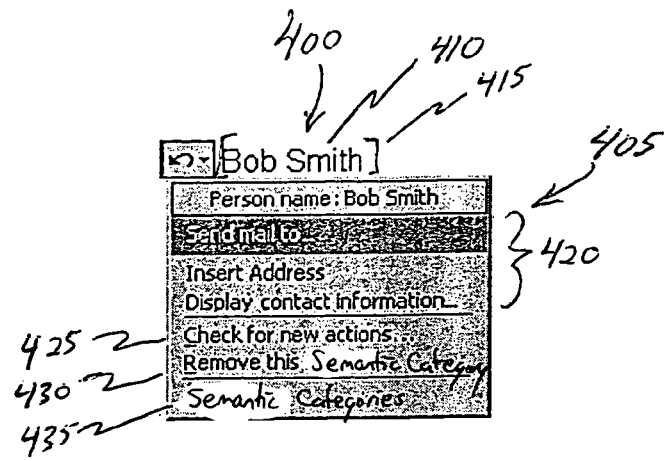
FIG. 4A is an illustration of a display of a preferred embodiment of a semantic category and its associated drop-down menu.

Typically, the first line of the dropdown menu indicates which string is the semantic category string (Bob Smith in FIG. 4A) and what type the semantic category is (Person name in FIG. 4A). Listed below the first line are actions 420 available for the semantic category type, such as "Send mail to . . . ", "Insert Adress", and "Display contact information . . . ".

The first item on the drop down menu below the seperator line is "Check for new actions . . . " 425. "Check for new actions . . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name". If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module sends a request to the action DLL to determine which actions are shown with each semantic category type.

Actions Performed in Association with Semantic Categories

There are a number of functions that users perform on typed data that preferred word processor program module 37 and semantic categories will make easier. The functions fall into two primary categories:

1) interacting with personal information manager contacts, tasks, meetings, and mail
2) interacting with properties on the World Wide Web or a corporate intranet A single string may be associated with multiple semantic categories. Every semantic category has a type label with one or more action plug-ins defined for the type label. For example, the "Address" type label may have the "Open in Mappoint", "Find with Expedia Maps" and "Add to my Address Book" actions associated with it and each of these actions may have a different action plug-in to execute the action.

The actions assigned to a semantic category are assigned on a per type label basis, not on a per semantic category basis. For example, all semantic categories of type label "Address" will have the same actions assigned to them. The actions assigned to type labels also depends on the computer that the application program module is running on. Thus, if a computer has three actions registered for the type label "Address", then all strings with an "Address" type label will be assigned to three actions. However, if one of these semantic categories is sent to a computer which has only two actions registered for the "Address" type label, then the user will only be exposed to two actions for this semantic category.

Nesting of Semantic categories

In an embodiment of the present invention, semantic categories may be nested inside each other. For example, the string "George Washington" may include a semantic category with type label "Person Name" for the span "George Washington State" and a semantic category with type label "State" for the span "Washington". Moreover, two semantic categories may cover exactly the same span. For example, the string "George Washington" may include a semantic category with type label "Person Name" and a semantic category with type label "President".

Figure 4B:
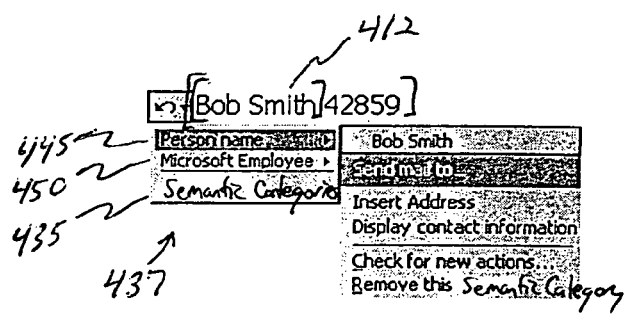
FIGS. 4B and 4C are illustrations of a display of a preferred embodiment of a semantic category and its associated cascade menu.
Figure 4C:
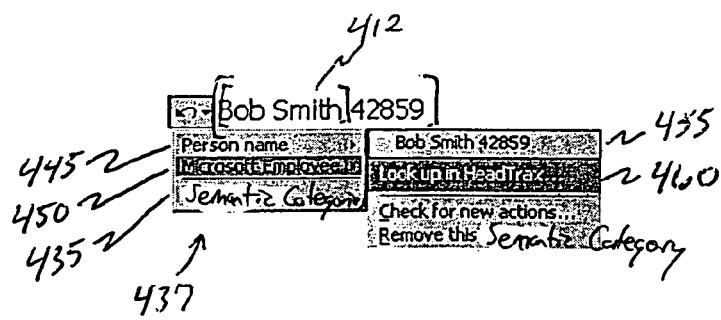

Because the preferred application program module 37 will support labeling a single string with multiple type labels (e.g. Bob Smith could be a semantic category labeled as a "Person Name" and labeled as a "Microsoft employee"), the preferred application program module 37 will use cascade menus on the dropdown menu if multiple semantic category types are assigned. Referring now to FIGS. 4B and 4C, cascade menu 437 is illustrated.

The cascade menu 437 includes a list of the type labels included in string 412. This list includes a type label "Person Name" 445 and a type label "Microsoft employee" 450. The cascade menu further comprises the "Semantic categories . . . " item 435.

As illustrated in FIG. 4B, by selecting the type label "Person Name" 445, the user is presented with the actions associated with the type label "Person Name". These actions are similar to those described above with regard to FIG. 4A.

As illustrated in FIG. 4C, by selecting the type label "Microsoft employee" 450, the user is presented with the actions associated with the type label "Microsoft employee". These actions are associated with the string "Bob Smith 42859" 455, whereas the actions illustrated in FIG. 4B are associated with the string "Bob Smith". The only action shown in FIG. 4C is the action 460 to "Look up in Head Trax . . . ".

It should be understood that FIGS. 4B-4C illustrate how a cascade menu may be used to allow the user to select which type label the user is interested in and to further select an action after selecting the type label.

In-Document User Interface to Indicate Semantic Categories

As described above with reference to FIGS. 4A-4C, in a preferred embodiment, the application program module includes the option to display an in-document user interface to indicate the location of semantic categories. This in-document user interface may use a colored indication to indicate the location of a semantic category, such as the brackets 415 in FIGS. 4A-4C. The in-document user interface will also be able to show nesting of semantic categories. For example, if Michael Jordan is labeled as a semantic category with type label "Person Name", Michael is a semantic category with type label "First Name" and Jordan is a semantic category with type label "Last Name", the document may look like this with the brackets indicating semantic categories:

[[Michael] [Jordan]]

Of course, the in-document user interface may be any sort of indication. For example, in the "EXCEL" spreadsheet application program, the interface comprises a triangle in the lower right hand portion of a cell to indicate that one or more semantic categories are present in the cell.

Invalidating the Semantic Categories of a Paragraph of Text

Whenever the user edits a paragraph of text or a cell value in a document of the application program module, that text is flagged as dirty and the recognizer plug-ins and the grammar checker program module (if used) will need to be consulted again to identify semantic categories. The concept of dirtying text is well-known in the art.

In a preferred embodiment, only semantic categories recognized by the grammar checker program module are discarded when a paragraph of text is dirtied. That is, the application program module retains semantic categories identified by recognizer plug-ins as well as those pasted into the document even though the text has been dirtied.

Turning Off Annotation/Managing Recognizer Plug-Ins

In a preferred embodiment, there is a check box in the application program module 37 that turns off all annotation of semantic categories. The radio switch is labeled "Label text with semantic categories as you type". It appears on the semantic categories tab of the autocorrect dialog. In this same dialog box, there will be a user interface to manage which recognizer plug-ins (including the grammar checker program module) are active.

The present invention allows tighter integration between names, dates, times, places, addresses, e-mail addresses and the information stored in e-mail and personal information managers. For example, using the present invention, the user can type a contact name into their document, select "Insert address" from the user interface and the contact's address will be identified in the personal information manager and inserted directly into the document.

As another example of the flexibility of the invention's architecture, suppose a user wants to find a map to a client's business. With the architecture of the present invention, an address will be recognized as such and the user may select "Show map" from a user interface to automatically open the appropriate web page in the web browser and automatically communicate with the mapping service, such as by sending address information automatically to the mapping service without nay user input. The invention saves the user the step of entering the address information into the appropriate fields, thus saving the user time and eliminating potential transcription errors.

It should be understood that an important aspect of the present invention is that the identification of semantic categories is performed at write time rather than read time. That is, semantic categories are identified, or recognized, by recognizer plug-ins as the user enters information into the document. One reason this is important is that the recognition relies on the writer's computer rather than the reader's computer. This is important because the writer's computer may contain recognizer plug-ins that are not included in the reader's computer. The reader may be presented with the option of downloading an action plug-in or a recognizer plug-in when they receive the document from writer.

The present invention satisfies the need for a system capable of recognizing strings of text in documents on-the-fly and labeling the strings with semantic information. After this string is labeled, then a list of actions may be displayed to the user based upon the label associated with the string.

It should be understood that the recognizer DLL may distribute any amount of text to the recognizer plug-ins. The invention has been described above in the context of the recognizer DLL sending a paragraph to a recognizer plug-in. However, any amount of text may be sent such as a sentence, a cell, a slide, etc.

Although the present invention has been described above as implemented in a word processing program module, it should be understood that the present invention may be implemented in other program modules, including, but not limited to, HTML authoring programs and programs such as the "POWERPOINT"® presentation graphics programand the "OFFICE" program module, both marketed by Microsoft Corporation of Redmond, Wash.

It should be understood that the recognizer DLL keeps track of pending work, such as the starting and ending position of the paragraph that is to be examined. During idle time, the recognizer DLL sends the paragraph to the recognizer plug-ins. If the user dirties a paragraph that has been sent to the recognizer plug-ins before the recognizer plug-ins return results, then the recognizer DLL marks the results as invalid. If the user dirties a paragraph after it has been checked for semantic categories, then the paragraph is re-checked by the recognizer plug-ins.

As described above, the semantic category may also include metadata returned by the recognizer plug-ins. For example, a recognizer plug-in that recognizes the titles of books may return as metadata an ISDN book number when it recognizes the title of a book. The ISDN book number metadata may then be used to provide actions. Metadata may also be used to disambiguate for actions and searches. For example, suppose a recognizer DLL is linked to a corporate employee database to recognize names. When the recognizer DLL recognizes "Bob Smith", it may store "employeeID=12345" as metadata in the background. Then, when an action is fired, the text in question will be known to reference Bob Smith, employee no. 12345 rather than Bob Smith, employee no. 45678. Also, the metadata may allow searches to be performed independent of the actual text in a document. So, a search may be conducted on "Robert Smith" by looking for employee 12345 in the employee databases and by performing a search on the metadata for employee number 12345 to find documents with "Bob Smith" in them. There are also numerous other functions for metadata. For instance, DHTML could be inserted so special tricks may be performed within a web browser. Additionally, data used by other actions may be inserted such as someone's e-mail address that could be used by the send-mail-to action, a normalized version of the date could be stored to easily interact with a personal information manager, etc.

It should also be understood that limited semantic category information may be sent from the application program module to the recognizer plug-ins. For example, a grammar checker program module may be able to recognize a person's name to create a type label "Person Names". This type label information may be sent to recognizer plug-in for them to use. For example, a recognizer plug-ins that recognizes the names of famous people may not need to search every paragraph that is sent to it. The famous people recognizer plug-in may only need to search strings that have been recognized and labeled as "Person Names" and then determine whether any of these strings is the name of a famous person.

It should be understood that in a preferred embodiment the semantic categories are stored in the native file format, in XML, and in HTML. Of course, the semantic categories may be stored in any file format without departing from the spirit and scope of the present invention.

In one embodiment, the invention comprises annotating strings in documents with semantic information as the document is created. After a string is annotated with semantic information, a range of actions that utilize both the semantic information and the text of the string-so-labeled may be provided to the user. For example, a word processor program module may use a grammar checker program DLL module to label person names. After a string has been labeled as a person's name, the word processor program module may, through a standard user interface mechanism, allow users to execute actions pertinent to a person's name. For example, the actions may be searching for the person's name in a contacts folder, sending electronic mail to the person's e-mail address or looking up the person's name in a human resources database. Of course, the examples provided above are simply examples and should not be construed as limiting the present invention.

The architecture of the present invention is designed to allow IT departments or independent vendors to build recognizers for any of these things, which could be deployed within an organization to label these strings in documents. The IT department or service vendor could also create actions specific to these data types (such as checking the store room for a particular chemical or displaying a spec sheet for it; checking the order backlog for a particular car or the quantity on hand for a particular part; checking the schedule to see when a course is being taught or which department a faculty member is in.) It should be understood that recognizer plug-ins can be designed to perform arbitrary computation. For example, a recognizer plug-in could be designed to annotate words found on a list with a particular property (e.g. in order to recognize names of companies). Another recognizer plug-in may annotate stock ticker symbols (by looking for 3 to 5 letter words that are all capitalized). Another recognizer plug-in may query a database to see whether a particular string is a book title. The book title database may be on a local machine, on the corporate Intranet or halfway around the world and accessible via the Internet. The possibilities for different plug-in designs is endless. As a result of the possible differences between recognizer plug-ins, the recognizer plug-ins will run in a separate thread and the recognizer DLL will be responsible for handling the asynchronicity that will result from different recognizer plug-ins returning their results with different delays.

It should be understood that the present invention is designed to be able to function without any recognizer plug-in DLLs and any action plug-in DLLs. For example, if there are no recognizer plug-in DLLs, semantic categories may still be recognized by a grammar checker program module. If there are no action plug-in DLLs, then the user may be presented with a menu item that allows them to go to a download site to install an action plug-in DLL. The action plug-in DLL and recognizer plug-in DLL may also be combined together into one plug-in DLL.

In alternative embodiments, the recognizer plug-ins may be able to modify the content of a document upon recognition of a semantic category, such as bolding a company's name.

In alternative embodiments, the application program module may fire an event within its object model so that a plug-in that uses the object model could execute a piece of code when a semantic category is recognized (such as to display a special user interface when a semantic category is labeled).

In an alternative embodiment, the language of the text may be passed to the recognizer DLL or recognizer plug-ins so that analysis of the text may be skipped if the text is an unsupported language.

In alternative embodiments, word-breaking or sentence-breaking may be done outside of the recognizer plug-ins.

In alternative embodiments, the recognizer plug-ins may be able to examine the content of the document beyond the paragraph of text it was given. For example, the preceding line in a document may be used to determine whether something is really an address.

It should be understood that a recognizer plug-in is not limited to simply applying labels to text. Once a recognizer plug-in identifies a string as being of a particular type, it may enter the string into a database, send e-mail, start another application, etc.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system stored on a computer medium for creating and editing an electronic document, a method for semantically labeling a string of text in the electronic document created in an application program module, the method comprising:

automatically receiving the string of text in a recognizer dynamic-link library after the entire string of text has been entered in the electronic document, wherein receiving the string of text comprises maintaining a job queue, the job queue storing the string of text before transmitting the string of text to at least one recognizer plug-in;

determining if the string of text has been edited before transmitting the string of text from the recognizer dynamic-link library to the at least one recognizer plug-in;

in response to determining if the string of text has been edited, deleting the edited string of text from the job queue;

in response to determining if the string of text has not been edited, transmitting the string of text, from the job queue, to the at least one recognizer plug-in during an idle time;

in each of the at least one recognizer plug-in, annotating the string of text to determine at least one label, wherein annotating the string of text comprises breaking the string of text by each of the at least one recognizer plug-in;

transmitting the at least one label from the at least one recognizer plug-in to the recognizer dynamic-link library, wherein transmitting the at least one label from the at least one recognizer plug-in comprises determining if the string of text annotated by the at least one recognizer plug-in has been edited after the string of text was transmitted to the recognizer dynamic-link library;

in response to determining the string of text has been edited after the string of text was transmitted to the recognizer dynamic-link library, transmitting the string of text from the application program module to the recognizer dynamic-link library;

compiling the at least one label into at least one semantic category at the recognizer dynamic-link library;

transmitting the at least one semantic category to the application program module such that each of the at least one label is associated with the string of text; and embedding the at least one semantic category in the electronic document.

2. The method of claim 1 further comprising synchronizing the at least one label received from the at least one recognizer plug-in before transmitting the at least one label to the application program module.

3. The method of claim 1 further comprising:
  receiving the at least one label in an action dynamic link library;
  transmitting the at least one label to at least one of action plug-in; and
  determining, in the at least one action plug-in, at least one action based on each of the at least one label and displaying at least one action received from the at least one action plug-in.

4. The method of claim 1 further comprising:
  causing the application program module to fire an event within an object model of the application program module; and
  causing a piece of code associated with the event to be executed when at least one of the at least one label is determined.

5. The method of claim 1 further comprising:
  before the step of receiving the string of text in the recognizer dynamic-link library, determining a language of the string of text and if the language is not recognized by the recognizer dynamic-link library, then ending the method.

6. The method of claim 1 wherein annotating the string of text to determine the at least one label further comprises comparing the string of text with at least one stored string to determine a match.

7. A method for labeling a string of text in an electronic document as the electronic document is created in an application program module, the method comprising:
  as the string of text is entered into the electronic document, automatically receiving the string of text in a recognizer dynamic link library during an idle time after the string of text has been entered in the electronic document and determining whether the string of text matches at least one stored string according to semantic categories, wherein receiving the string of text comprises:
    maintaining a job queue, the job queue storing the string of text before transmitting the string of text to at least one recognizer plug-in,
    determining if the string of text has been edited,
    in response to determining if the string of text has been edited, deleting the edit string of text from the job queue; and
    in response to determining if the string of text has not been edited, transmitting the string of text, from the job queue, to the at least one recognizer plug-in during an idle time;
  if so, then determining a label associated with the matched stored string, wherein determining the label associated with the matched stored string comprises breaking the string of text by each of the at least one recognizer plug-in;
  associating the label with the string of text;
  transmitting the semantic categories to the application program module, wherein transmitting the semantic categories to the application module comprises determining if the string of text associated with the label has been edited after the string of text was transmitted to the recognizer dynamic-link library;
  in response to determining if the string of text associated with the label has been edited after the string of text was transmitted to the recognizer dynamic-link library, transmitting the string of text from the application program module to the recognizer dynamic-link library; and
  embedding the semantic categories in the electronic document.

8. The method recited in claim 7 further comprising determining at least one action associated with the label.

9. The method recited in claim 8 further comprising displaying an indication indicating that the label has been found for the string of text.

10. The method recited in claim 9 further comprising:
  determining that a user has selected the string of text; and
  in response, displaying the at least one action to the user.

11. The method recited in claim 10 further comprising:
  receiving an indication that one of the at least one action has been selected; and
  in response to receiving the indication that one of the at least one action has been selected, then causing the selected one of the at least one action to execute.

12. The method recited in claim 11 wherein causing the selected one of the at least one action to execute comprises determining whether an action plug-in dynamic link library assigned to the selected action is available; and
  if so, then receiving instructions from the action dynamic link library assigned to the selected action.

13. The method recited in claim 12 further comprising:
  if the action plug-in dynamic link library is not available, then using a Uniform Resource Locator assigned to the action to navigate to a Web site and download the action plug-in dynamic link library.

14. The method recited in claim 13 further comprising determining metadata associated with the string of text.

15. A system, stored on a computer medium, for labeling a string in an electronic document as the string is entered into the electronic document, the system comprising:
  an application program module for creating the electronic document;
  a recognizer dynamic link library connected to the application program module, wherein the recognizer dynamic link library automatically receives the string during an idle time after the string has been entered in the electronic document; and
  at least one recognizer plug-in connected to the recognizer dynamic link library, wherein the at least one recognizer plug-in receives the string, annotates the string to determine a label according to semantic categories embedded in the electronic document, wherein the string annotated to determine the label comprises break the string by each of the at least one recognizer plug-in, and associates the label with the string, wherein the at least one recognizer plug-in receiving the string comprises:
    maintain a job queue, the job queue storing the string before transmitting the string to at least one recognizer plug-in,
    determine if the string has been edited before transmitting the string to the at least one recognizer plug-in,
    in response to the determination if the string has been edited before transmitting the string to the at least one recognizer plug-in, delete the edited string from the job queue,
    in response to the determination if the string has not been edited before transmitting the string to the at least one recognizer plug-in, transmit the string, from the job queue, to the at least one recognizer plug-in during an idle time,
    determine if the string of text associated with the label has been edited after the string of text was transmitted to the recognizer dynamic-link library;
    in response to determining if the string of text associated with the label has been edited after the string of text was transmitted to the dynamic-link library, transmit the string of text from the application program module to the recognizer dynamic-link library, and an action dynamic link library connected to the application program module.

16. The system of claim 15 further comprising at least one action plug-in connected to the action dynamic link library.

17. The system of claim 15 wherein the at least one recognizer plug-in compares the string to at least one stored string to determine whether the string matches any of the stored strings according to the semantic categories embedded in the electronic document.

18. The system of claim 17 wherein the label is associated with the matched stored string.

19. For an electronic system for creating and editing an electronic document, a computer-readable storage medium with instructions stored thereon for semantically labeling a string of text in the electronic document created in an application program module, the instructions comprising:

automatically receiving the string of text in a recognizer dynamic-link library after the entire string of text has been entered in the electronic document, wherein receiving the string of text comprises maintaining a job queue, the job queue storing the string of text before transmitting the string of text to at least one recognizer plug-in;

determining if the string of text has been edited;

in response to determining if the string of text has been edited, deleting the edited string of text from the job queue;

in response to determining if the string of text has not been edited, transmitting the string of text, from the job queue, to the at least one recognizer plug-in during an idle time;

in each of the at least one recognizer plug-in, annotating the string of text to determine a label according to semantic categories embedded in the electronic document, wherein annotating the string of text comprises breaking the string of text by each of the at least one recognizer plug-in;

associating each label with the string of text;

transmitting the labels from the at least one recognizer plug-ins to the recognizer dynamic-link library;

transmitting the labels to the application program module, wherein transmitting the labels to the application module comprises determining if the string of text associated with each label has been edited after the string of text was transmitted to the recognizer dynamic-link library;

in response to determining if the string of text associated with each label has been edited after the string of text was transmitted to the recognizer dynamic-link library, transmitting the string of text from the application program module to the recognizer dynamic-link library;

receiving the labels in the action dynamic link library;

transmitting the labels to at least one action plug-in; and determining, in the at least one action plug-in, at least one action based on each of the labels and displaying at least one action received from the at least one action plug-in.

* * * * *